(12) United States Patent
Grooms et al.

(10) Patent No.: US 11,499,480 B2
(45) Date of Patent: Nov. 15, 2022

(54) COMBUSTOR CAP ASSEMBLY HAVING IMPINGEMENT PLATE WITH COOLING TUBES

(71) Applicant: General Electric Company, Schenectady, NY (US)

(72) Inventors: Neal William Grooms, Simpsonville, SC (US); Charlie Edmond Jones, Greer, SC (US); Lucas John Stoia, Taylors, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/940,953

(22) Filed: Jul. 28, 2020

(65) Prior Publication Data

US 2022/0034261 A1 Feb. 3, 2022

(51) Int. Cl.
*F02C 7/00* (2006.01)
*F02C 7/18* (2006.01)
*F23R 3/26* (2006.01)
*F23R 3/28* (2006.01)
*F23R 3/10* (2006.01)

(52) U.S. Cl.
CPC .............. *F02C 7/18* (2013.01); *F23R 3/10* (2013.01); *F23R 3/26* (2013.01); *F23R 3/286* (2013.01)

(58) Field of Classification Search
None
See application file for complete search history.

(56) References Cited

U.S. PATENT DOCUMENTS

| | | | | | |
|---|---|---|---|---|---|
| 2,664,458 | A | * | 12/1953 | Rapata | H02G 3/083 16/2.5 |
| 3,552,754 | A | * | 1/1971 | Bow | F16J 15/00 277/606 |
| 3,844,588 | A | * | 10/1974 | Jocsak | F28F 9/0131 285/140.1 |
| 4,305,453 | A | * | 12/1981 | Wagner | F28F 9/0131 165/162 |

(Continued)

OTHER PUBLICATIONS

Non-Final Office Action dated Sep. 22, 2021 for U.S. Appl. No. 16/940,965, filed Jul. 28, 2020; pp. 28.

(Continued)

*Primary Examiner* — Edwin Kang
(74) *Attorney, Agent, or Firm* — Charlotte Wilson; James Pemrick; Hoffman Warnick LLC

(57) ABSTRACT

A combustor cap assembly, combustor and related method are disclosed. The combustor cap assembly includes: an impingement plate defining a plurality of impingement cooling holes with a first side of the impingement plate in fluid communication with a cooling air plenum. The assembly also includes a combustor cap plate coupled to the impingement plate, such that an impingement air plenum is defined between a second side of the impingement plate and the combustor cap plate. Tubes extend from at least a portion of the plurality of impingement cooling holes at the second side of the impingement plate and extend partially towards the combustor cap plate through the impingement air plenum. The plurality of impingement cooling holes provides for fluid communication between the cooling air plenum and the impingement air plenum through the tubes.

10 Claims, 10 Drawing Sheets

(56) References Cited

U.S. PATENT DOCUMENTS

| | | | |
|---|---|---|---|
| 6,237,344 B1* | 5/2001 | Lee | F01D 25/12 |
| | | | 60/754 |
| 6,546,732 B1* | 4/2003 | Young | F23D 14/78 |
| | | | 60/740 |
| 8,756,934 B2 | 6/2014 | Melton et al. | |
| 9,297,533 B2 | 3/2016 | Melton et al. | |
| 9,470,421 B2 | 10/2016 | Stoia et al. | |
| 9,835,333 B2 | 12/2017 | Antoniono et al. | |
| 9,890,954 B2 | 2/2018 | Carnell, Jr. et al. | |
| 9,964,308 B2 | 5/2018 | Antoniono et al. | |
| 2007/0169992 A1 | 7/2007 | Wasif et al. | |
| 2011/0005233 A1 | 1/2011 | Sadig et al. | |
| 2011/0067379 A1 | 3/2011 | Khan et al. | |
| 2011/0091298 A1 | 4/2011 | Bowers et al. | |
| 2011/0113748 A1 | 5/2011 | Lains et al. | |
| 2011/0265484 A1* | 11/2011 | Huber | F23M 20/005 |
| | | | 60/755 |
| 2012/0060511 A1 | 3/2012 | Zuo et al. | |
| 2013/0074503 A1 | 3/2013 | Rohrssen et al. | |
| 2014/0020389 A1 | 1/2014 | Melton et al. | |
| 2014/0053571 A1* | 2/2014 | Keener | F23R 3/286 |
| | | | 60/782 |
| 2014/0311156 A1* | 10/2014 | Tretyakov | F23R 3/10 |
| | | | 60/725 |
| 2015/0226435 A1 | 8/2015 | Melton et al. | |
| 2015/0241064 A1* | 8/2015 | Boardman | F23R 3/283 |
| | | | 60/737 |
| 2015/0362190 A1* | 12/2015 | Taylor | F23R 3/06 |
| | | | 29/888.012 |
| 2016/0054004 A1* | 2/2016 | Stoia | F02C 7/18 |
| | | | 60/806 |
| 2016/0245513 A1 | 8/2016 | Buchheim et al. | |
| 2016/0298841 A1* | 10/2016 | Papple | F23R 3/04 |
| 2017/0051788 A1 | 2/2017 | Kim | |
| 2017/0101932 A1* | 4/2017 | Stover | F01D 25/12 |
| 2017/0167728 A1 | 6/2017 | Gonyou et al. | |
| 2018/0274780 A1 | 9/2018 | Kim et al. | |
| 2019/0211949 A1* | 7/2019 | Custer | F16L 9/19 |
| 2019/0368736 A1 | 12/2019 | Rudrapatna et al. | |
| 2022/0034509 A1 | 2/2022 | Grooms et al. | |

OTHER PUBLICATIONS

Final Office Action dated Jan. 13, 2022 for U.S. Appl. No. 16/940,965, filed Jul. 28, 2020; pp. 21.

* cited by examiner

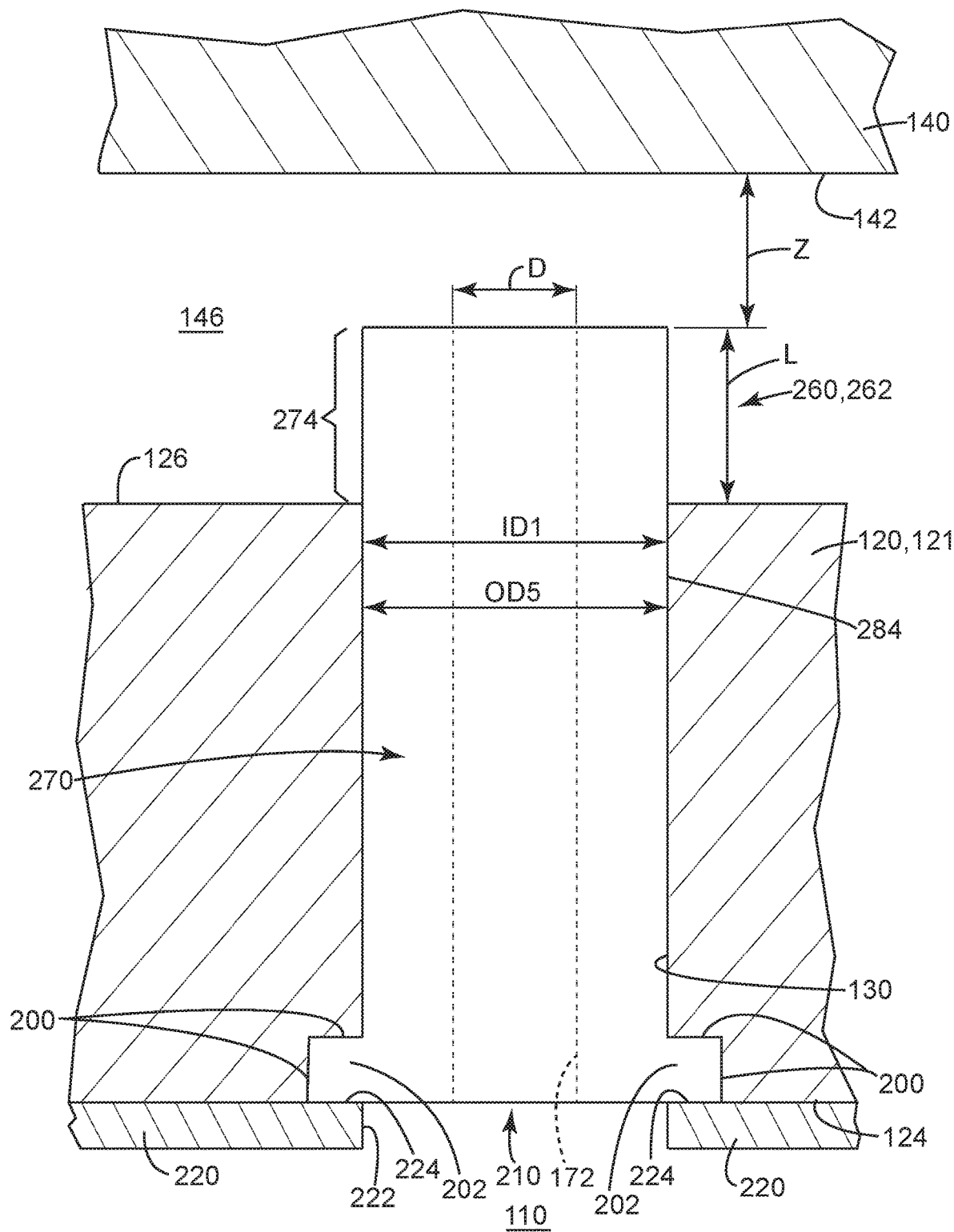

COMBUSTOR CAP ASSEMBLY HAVING IMPINGEMENT PLATE WITH COOLING TUBES

TECHNICAL FIELD

The disclosure relates generally to turbomachinery and, more particularly, to a combustor cap assembly impingement plate including cooling tubes for directing coolant to an upstream side of a cap plate.

BACKGROUND

In an air-ingesting turbomachine (e.g., a gas turbine), air enters a compressor and is progressively pressurized as it is routed towards a combustor. The compressed air is premixed with a fuel and ignited within a reaction zone defined within a combustor liner, thus producing high temperature combustion gases. The combustion gases are then routed from the combustion chamber via the liner and/or a transition piece into a turbine section of the turbomachine where the combustion gases flow across alternating rows of stationary vanes and rotor blades, the latter of which are secured to a rotor shaft. As the combustion gases flow across the rotor blades, kinetic and/or thermal energy are transferred to the rotor blades, thus causing the rotor shaft to rotate.

To increase turbine efficiency, modern combustors are operated at high temperatures, which generate high thermal stresses on various mechanical components disposed within the combustor. As a result, at least a portion of the compressed air supplied to the combustor is used as cooling air to cool these components. For example, particular combustors include a generally annular combustor cap assembly that at least partially surrounds one or more fuel nozzles within the combustor. Certain combustor cap assembly designs include a cap plate that is disposed at a downstream end of the combustor cap assembly. The fuel nozzles extend at least partially through the cap plate, which is typically disposed substantially adjacent to the combustion chamber. As a result, the cap plate is generally exposed to extremely high temperatures.

One way to cool the cap plate is to route a portion of a coolant, such as compressed, cooling air, into the combustor cap assembly and onto an upstream side of the cap plate. The coolant is directed to the upstream side of the cap plate by an impingement plate that includes a number of holes therein. The impingement plate and the cap plate form an impingement air plenum therebetween. Current impingement plates may also include cooling flow return passages that route the coolant from the impingement cooling plenum upstream of the cap plate to cool other parts of the combustor. One challenge with cooling this form of combustor cap assembly is that the cooling air may be re-directed away from the cap plate prior to it impinging on the upstream side of the cap plate, thus reducing its cooling effectiveness on the cap plate.

BRIEF DESCRIPTION

An aspect of the disclosure provides a combustor cap assembly, comprising: an impingement plate defining a plurality of impingement cooling holes, wherein a first side of the impingement plate is in fluid communication with a cooling air plenum; a combustor cap plate coupled to the impingement plate, wherein the combustor cap plate and a second side of the impingement plate define an impingement air plenum therebetween; and tubes extending from at least a portion of the plurality of impingement cooling holes at the second side of the impingement plate and extending partially towards the combustor cap plate through the impingement air plenum; wherein the plurality of impingement cooling holes provides for fluid communication between the cooling air plenum and the impingement air plenum through the tubes.

Another aspect of the disclosure provides a combustor, comprising: a combustor cap assembly including: an impingement plate defining a plurality of impingement cooling holes, wherein a first side of the impingement plate is in fluid communication with a cooling air plenum; a cap plate coupled to the impingement plate, wherein the cap plate and a second side of the impingement plate define an impingement air plenum therebetween; and tubes extending from at least a portion of the plurality of impingement cooling holes at the second side of the impingement plate and extending partially towards the cap plate through the impingement air plenum; wherein the plurality of impingement cooling holes provides for fluid communication between the cooling air plenum and the impingement air plenum through the tubes; and a fuel nozzle extending through the combustor cap assembly.

An aspect of the disclosure provides a method comprising: communicating a cooling air flow from a cooling air plenum through an impingement plate defining a plurality of impingement cooling holes therein, wherein a first side of the impingement plate is in fluid communication with the cooling air plenum; and directing the cooling air flow through tubes extending from at least a portion of the plurality of impingement cooling holes at a second side of the impingement plate toward a combustor cap plate.

Yet another aspect includes an insert for an impingement plate including a plurality of cooling holes therein, the insert comprising: a body including: an opening extending longitudinally therethrough; a discharge end configured for positioning in an impingement air plenum between the impingement plate and an upstream surface of a combustor cap plate; a flexible insertion end configured for insertion into a respective cooling hole of the plurality of cooling holes; and a fixation element between the discharge end and the flexible insertion end, the fixation element having a first outer dimension configured to fixedly couple the body in the respective cooling hole.

Another aspect relates to an impingement plate for a combustor cap assembly, comprising: a first body defining a plurality of impingement cooling holes, wherein a first side of the first body is configured to be positioned in fluid communication with a cooling air plenum and a second side of the first body is configured to connect in a spaced manner to a combustor cap plate, the second side of the first body and the combustor cap plate defining an impingement air plenum therebetween; and tubes extending from at least a portion of the plurality of impingement cooling holes at the second side of the impingement plate.

The illustrative aspects of the present disclosure are designed to solve the problems herein described and/or other problems not discussed.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which:

FIG. 10 shows an enlarged cross-sectional view of a cooling tube insert inserted in an impingement plate, according to alternative embodiments of the disclosure.

Figure 1:
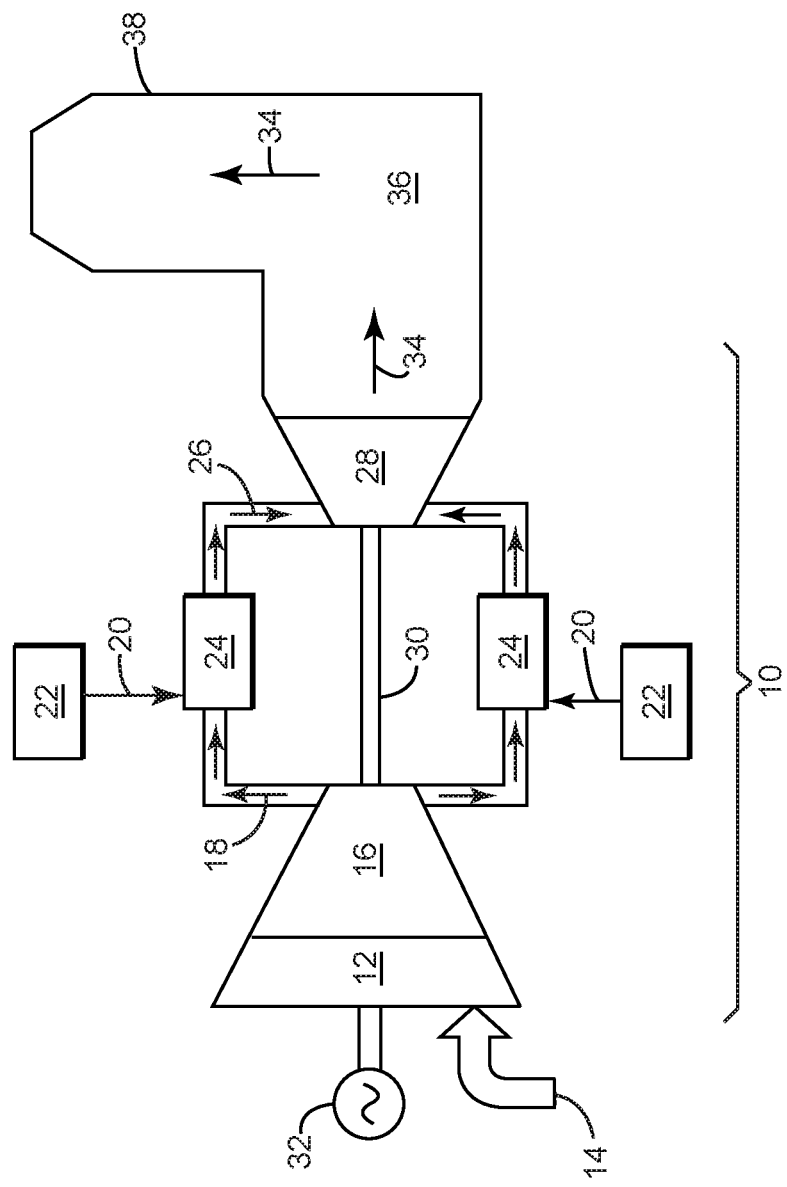
FIG. 1 is a schematic diagram of an illustrative turbomachine in the form of a gas turbine that may incorporate at least one embodiment of the disclosure.

It is noted that the drawings of the disclosure are not necessarily to scale. The drawings are intended to depict only typical aspects of the disclosure, and therefore should not be considered as limiting the scope of the disclosure. In the drawings, like numbering represents like elements between the drawings.

DETAILED DESCRIPTION

As an initial matter, in order to clearly describe the current technology, it will become necessary to select certain terminology when referring to and describing relevant machine components within a turbomachine, or a combustor section thereof. To the extent possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbine engine or, for example, the flow of air through the combustor or coolant through one of the combustion section's components. The term "downstream" corresponds to the direction of flow of the fluid, and the term "upstream" refers to the direction opposite to the flow. As used herein, the flow of fluid is that of the cooling air flow. The terms "forward" and "aft," without any further specificity, refer to directions, with "forward" referring to the front or compressor end of the engine (or the inlet end of the combustor), and "aft" referring to the rearward or turbine end of the engine (or the outlet end of the combustor).

It is often required to describe parts that are disposed at differing radial positions with regard to a center axis. The term "radial" refers to movement or position perpendicular to an axis. For example, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. The term "axial" refers to movement or position parallel to an axis. Finally, the term "circumferential" refers to movement or position around an axis. It will be appreciated that such terms may be applied in relation to the center axis of the combustor, described herein.

In addition, several descriptive terms may be used regularly herein, as described below. The terms "first", "second", and "third" may be used interchangeably to distinguish one component from another and are not intended to signify location or importance of the individual components.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components but do not preclude the presence or addition of one or more other features, integers, steps, operations, elements, components, and/or groups thereof. "Optional" or "optionally" means that the subsequently described event or circumstance may or may not occur or that the subsequently described component or feature may or may not be present, and that the description includes instances where the event occurs or the component is present and instances where it does not occur or is not present.

Where an element or layer is referred to as being "on," "engaged to," "coupled to" or "connected to" another element or layer, it may be directly on, engaged to, coupled to, or connected to the other element or layer, or intervening elements or layers may be present. In contrast, when an element is referred to as being "directly on," "directly engaged to," "directly coupled to" or "directly connected to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

As indicated above, the disclosure provides an impingement plate having cooling tubes therein that deliver cooling air closer to an upstream side of a combustor cap plate. A combustor cap assembly and combustor including the impingement plate are also provided. Inserts to create the cooling tubes in an impingement plate and a related method are also described herein. The tubes, which may extend from any number of a plurality of impingement cooling holes at the side of the impingement plate next to the combustor cap plate, extend partially towards the combustor cap plate through an impingement air plenum between the impingement plate and the combustor cap plate. The plurality of impingement cooling holes provides for fluid communication between the cooling air plenum and the impingement air plenum through the tubes. The cooling tubes prevent the cooling air from being prematurely re-directed away from the combustor cap plate prior to it impinging on the upstream side of the combustor cap plate, thus improving cooling of the cap plate.

As will be described, the cooling tubes may be integrally formed with the impingement plate, e.g., via additive manufacture or casting, or inserts for the cooling holes can create the cooling tubes for the impingement plate. The inserts may include a body having a discharge end configured for positioning in an impingement air plenum between the impingement plate and an upstream surface of a combustor cap plate, and a flexible insertion end configured for insertion into a respective cooling hole in the impingement plate. A fixation element between the discharge end and the flexible insertion end has an outer dimension configured to fixedly couple the body in the respective cooling hole.

FIG. 1 provides a functional block diagram of an illustrative gas turbine system 10 ("GT system" 10) that may incorporate various embodiments of the disclosure. As shown, GT system 10 generally includes an inlet section 12 that may include a series of filters, cooling coils, moisture separators, and/or other devices to purify and otherwise condition a working fluid, such as air 14, entering GT system 10. Air 14 flows to a compressor section where a compressor 16 progressively imparts kinetic energy to air 14 to produce a compressed or pressurized air 18 (sometimes also referred to herein as "air 18" or "cooling air 18").

Compressed air 18 is mixed with a fuel 20 from a fuel source 22 to form a combustible mixture within one or more combustors 24. The combustible mixture is burned to produce combustion gases 26 having a high temperature, pressure and velocity. Combustion gases 26 flow through a turbine 28 of a turbine section to produce work. For example, turbine 28 may be coupled to a shaft 30 so that rotation of turbine 28 drives compressor 16 to produce compressed air 18. Alternatively, or in addition, shaft 30 may connect turbine 28 to a generator 32 for producing electricity. Exhaust gases 34 from turbine 28 flow through an exhaust section 36 that connects turbine 28 to an exhaust stack 38 downstream from turbine 28. Exhaust section 36 may include, for example, a heat recovery steam generator (not shown) for cleaning and extracting additional heat from exhaust gases 34 prior to release to the environment.

Figure 2:
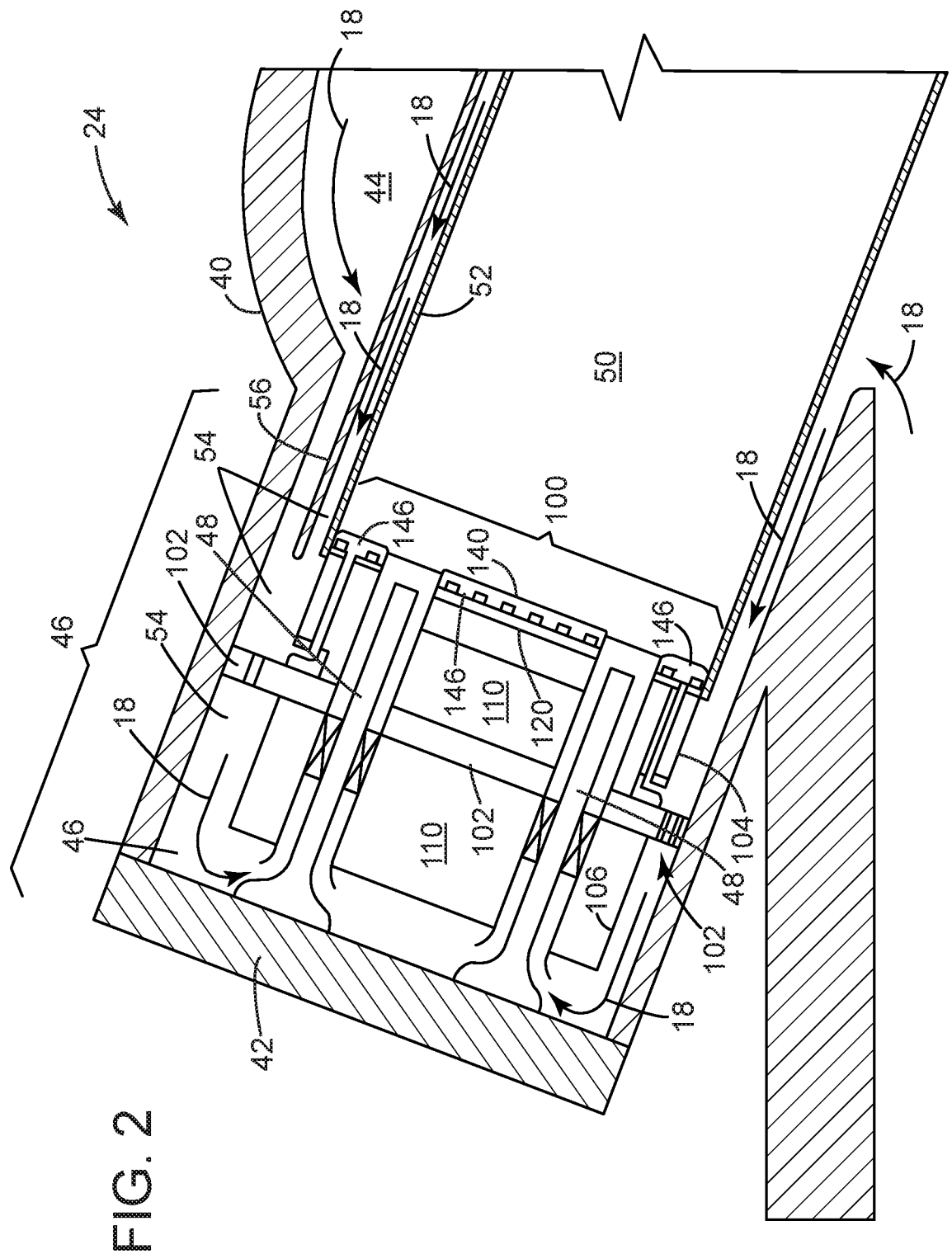
FIG. 2 is a cross-sectional side view of a portion of an illustrative combustion section in which teachings of the disclosure may be employed.

FIG. 2 is a cross-sectional side view of a portion of an illustrative combustor 24 according to one or more embodiments of the disclosure. As shown in FIG. 2, combustor 24 is at least partially surrounded by at least one outer casing 40, such as a compressor discharge casing. Outer casing 40 is in fluid communication with compressor 16 (FIG. 1) so as to receive at least a portion of compressed air 18 therefrom.

As shown in FIG. 2, an end cover 42 is coupled to outer casing 40 to provide a seal around an opening defined within outer casing 40. The opening is generally sized for receiving combustor 24. Outer casing 40 (and/or end cover 42) at least partially defines a high pressure plenum 44, which at least partially surrounds combustor 24. A head end portion 46 of combustor 24 is at least partially defined by end cover 42 and outer casing 40. Head end portion 46 defines an area within combustor 24 where a portion of compressed air 18 from high pressure plenum 44 reverses flow direction.

At least one fuel nozzle 48 extends substantially axially within outer casing 40 with respect to an axial centerline of combustor 24 and/or an axial centerline of end cover 42. As shown in FIG. 2, combustor 24 may include a plurality of fuel nozzles 48 extending axially within head end portion 46. Fuel nozzle 48 may be coupled at a first end to end cover 42. A second or downstream end of fuel nozzle 48 terminates proximate to a combustion chamber or zone 50 defined within a combustion liner 52, which extends downstream from fuel nozzle 48. As will be described, fuel nozzle(s) 48 extend into a combustor cap assembly 100.

Combustion liner 52 may at least partially define an annular flow passage 54 within outer casing 40. In particular embodiments, annular flow passage 54 may be defined or further defined by one or more of an impingement sleeve or liner 56, which surrounds combustion liner 52. In particular embodiments, annular flow passage 54 may be defined or further defined by any one or more of outer casing 40, end cover 42 and/or other liners or features, such as an inner wall provided within outer casing 40. Annular passage 54 provides for fluid communication between high pressure plenum 44 and head end portion 46 of combustor 24.

In various embodiments, combustor cap assembly 100 extends radially, circumferentially and axially within a forward, or upstream, end of liner 42. In one embodiment, combustor cap assembly 100 includes an annularly shaped flow conditioning plate 102 and an annularly shaped shroud 104. In particular embodiments, combustor cap assembly 100 may include an annularly shaped secondary shroud 106, which extends from a forward end portion 108 of flow conditioning plate 102 towards end cover 42. Shroud 104 and/or secondary shroud 106 may be coaxially aligned with flow conditioning plate 102.

As shown in FIG. 2, flow conditioning plate 102, shroud 104 and/or secondary shroud 106 circumferentially surround at least a portion of fuel nozzle(s) 48. In one embodiment, as shown in FIG. 2, flow conditioning plate 102 and shroud 104 at least partially define a cooling air plenum 110 around fuel nozzle 48 within combustor cap assembly 100. In other embodiments, cooling air plenum 110 may be further defined by secondary shroud 106. Cooling air plenum 110 is in fluid communication with head end portion 46 of combustor 24, which, as stated, is in fluid communication with high pressure plenum 44 to deliver coolant to cooling air plenum 110. Passages in flow conditioning plate 102 may also be in fluid communication with cooling air plenum 110.

Figure 3:
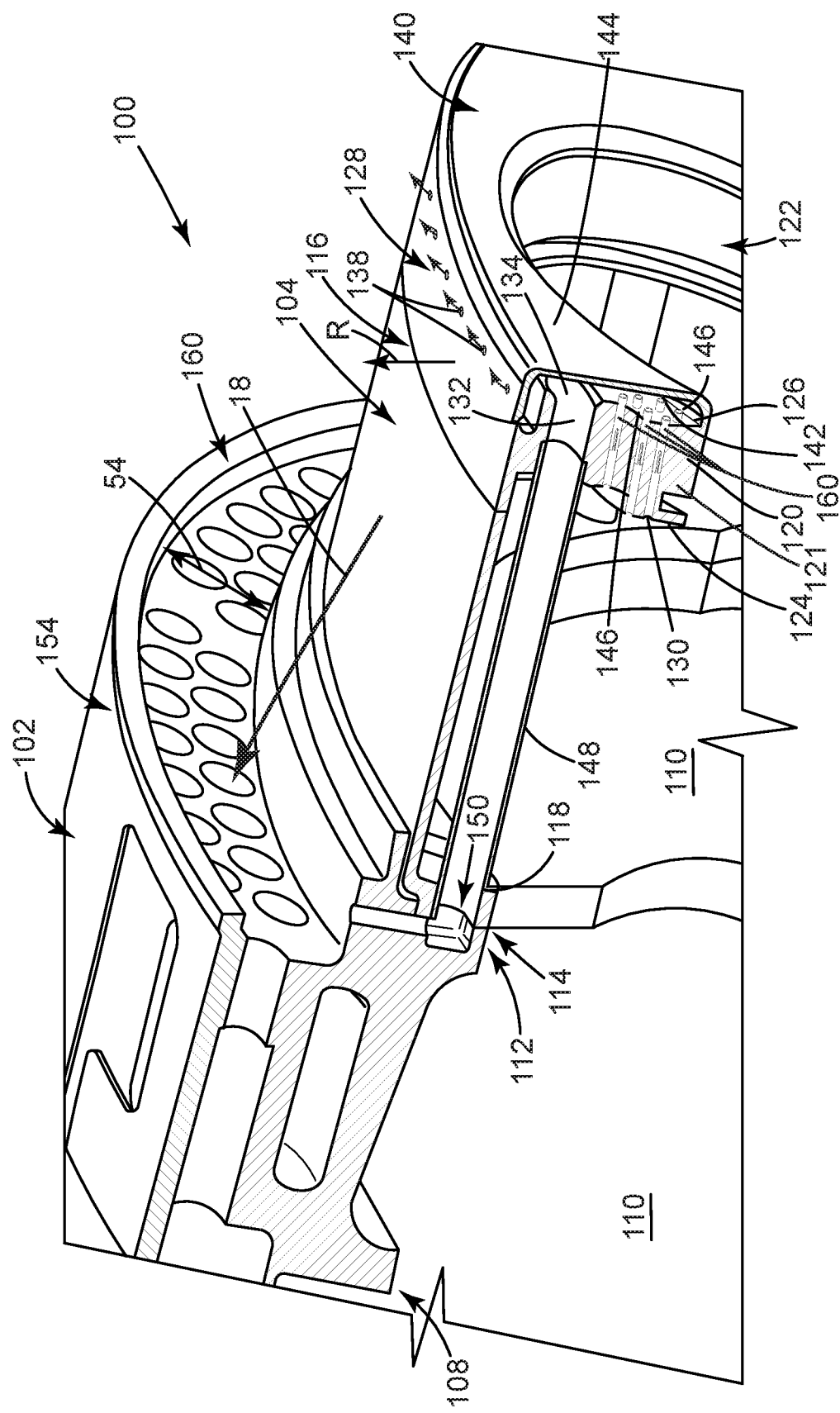
FIG. 3 is a cross-sectional perspective view of a portion of an illustrative combustor cap assembly, according to one or more embodiments of the disclosure.
Figure 4:
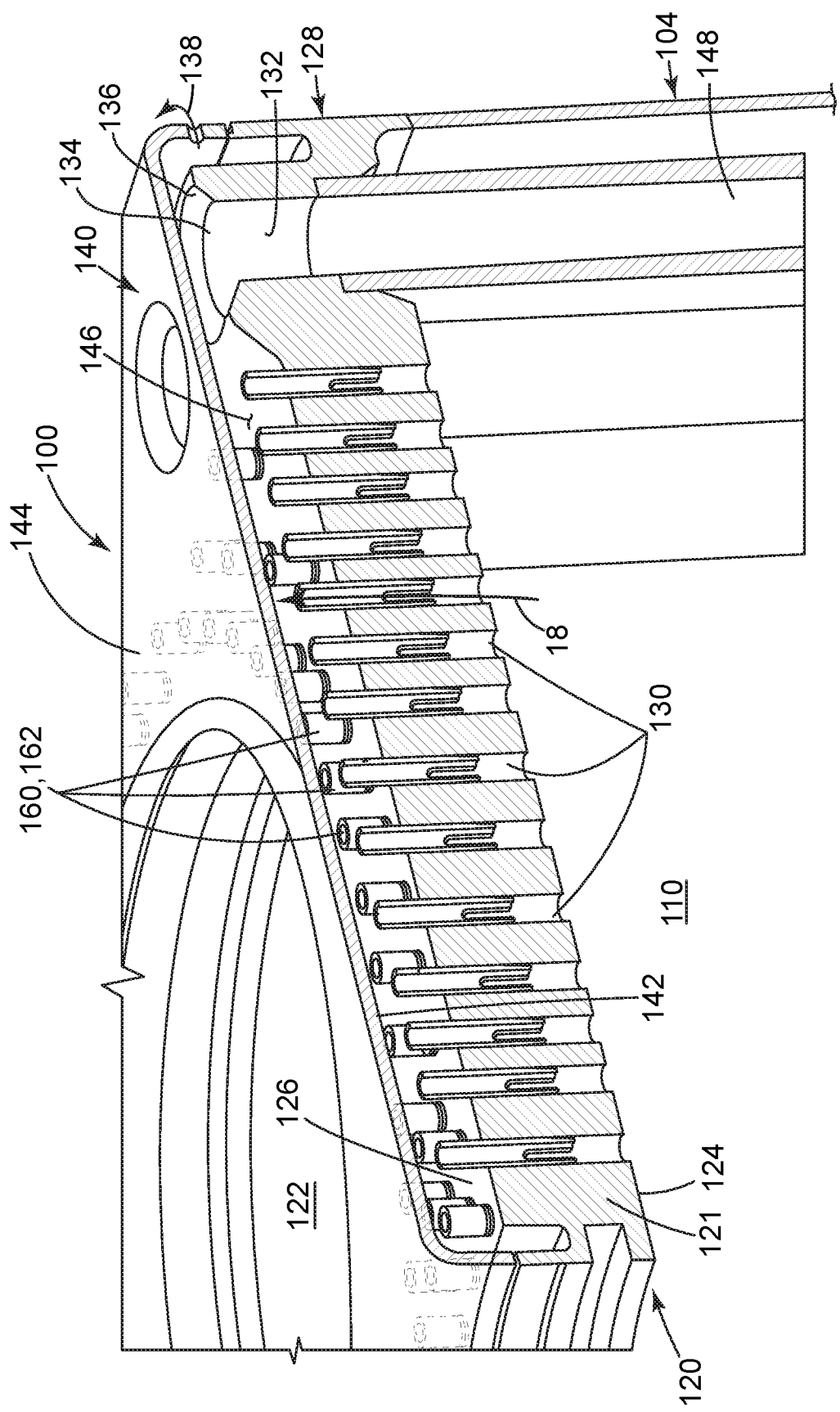
FIG. 4 is an enlarged partial cross-sectional view of a combustor cap assembly with cooling tube inserts, according to one or more embodiments of the disclosure.

FIG. 3 is a cross-sectional perspective view of a portion of combustor cap assembly 100 as shown in FIG. 2 (with fuel nozzles 48 removed), according to one or more embodiments of the disclosure, and FIG. 4 is an enlarged partial cross-sectional view of combustor cap assembly 100. In one embodiment, as shown in FIG. 3, shroud 104 extends axially away from an aft end portion 112 of flow conditioning plate 102. Shroud 104 includes a first or forward end portion 114, which is axially separated from a second or aft end portion 116. In one embodiment, as shown in FIG. 3, a flange 118 extends radially inwardly from shroud 104 towards an axial centerline of shroud 104. In one embodiment, flange 118 is disposed proximate to first end portion 114. Flange 118 may be used to couple or connect shroud 104 to a mounting feature (not shown) of flow conditioning plate 102. For example, one or more bolts or other suitable fasteners (not shown) may extend through flange 118 to secure or couple the two components together.

As shown in FIGS. 3 and 4, combustor cap assembly 100 further includes an impingement plate 120. In one embodiment, impingement plate 120 is coupled to shroud 104 proximate to second end portion 116. Impingement plate 120 includes a body 121 that extends radially and circumferentially at least partially across second end portion 116 of shroud 104. Impingement plate 120 may at least partially define at least one fuel nozzle passage 122 which extends generally axially therethrough for receiving fuel nozzle 48 (FIG. 2).

As shown in FIGS. 3 and 4, impingement plate 120 and, more particularly, body 121 thereof, includes a first or upstream side 124. Impingement plate 120 (body 121) also includes a second or downstream side 126. First side 124 of body 121 is configured to be positioned in fluid communication with cooling air plenum 110, and second side 126 of body 121 is configured to couple in a spaced manner to combustor cap plate 140, e.g., via welding. Second side 126 of body 121 and cap plate 140 define an impingement air plenum 146 therebetween. Impingement plate 120 may further include an outer band portion 128. Outer band portion 128 at least partially defines a radially outer perimeter of impingement plate 120. In various embodiments, as shown in FIGS. 3 and 4, impingement plate 120 and, more particularly, body 121 thereof, at least partially defines a plurality of impingement cooling holes 130. Impingement cooling holes 130 extend through first side 124 and second side 126 (FIGS. 3 and 4) to provide for fluid communication from cooling air plenum 110 through impingement plate 120 to impingement air plenum 146.

Figure 5:
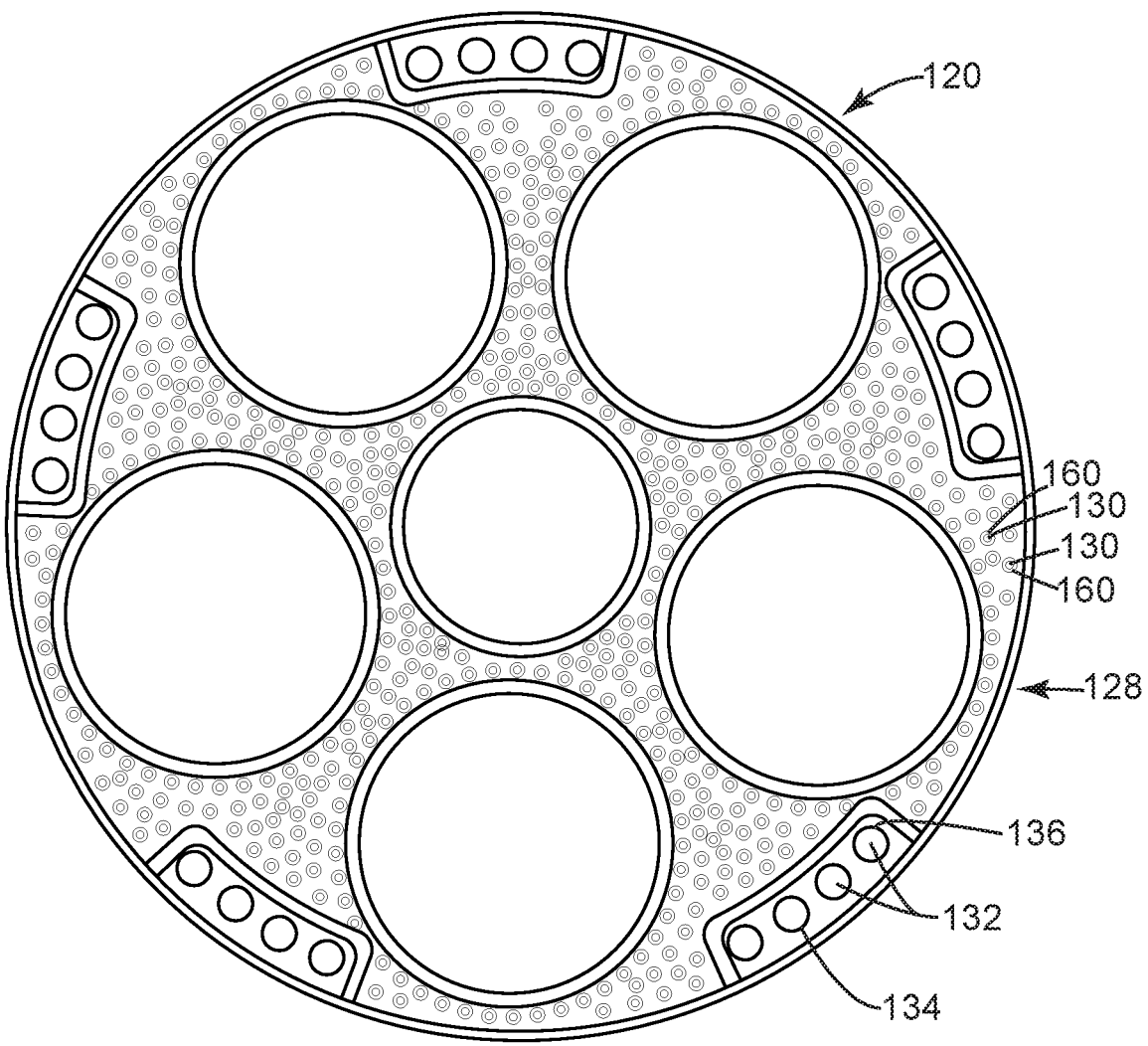
FIG. 5 is a plan view of a combustor cap plate according to embodiments of the disclosure.

In one embodiment, as shown in FIGS. 3-5, impingement plate 120 further defines at least one cooling flow return passage 132. As illustrated, cooling flow return passage 132 extends through first side 124 and second side 126 to provide for fluid communication through impingement plate 120. In one embodiment, cooling flow return passage 132 extends substantially axially through impingement plate 120. An inlet 134 to cooling flow return passage 132 is defined along second side 126 of impingement plate 120. In one embodiment, a raised portion or area 136 of second side 126 surrounds inlet 134. Raised portion 136 is raised axially outwardly with respect to the surrounding second side 126.

In particular embodiments, as shown in FIG. 3, outer band portion 128 at least partially defines a plurality of cooling passages 138 which extend, in contrast to conventional cooling passages, substantially at an angle relative to a radius R through outer band portion 128 of impingement plate 120. Plurality of cooling passages 138 provides for fluid communication out of impingement air plenum 146 in an outward direction at an angle relative to a radius R. In this manner, cooling air exiting cooling passages 138 is caused to exit outer band portion 128 in an outward direction at an angle relative to radius R to create a cooling film over an outer surface thereof. The angle can be any desired angle to create the desired exiting angle for cooling air 18. In one optional embodiment, a greater number of cooling passages 138 may be formed or concentrated proximate to inlet 134 of cooling flow return passage 132 than along areas of outer band portion 128 which are not close to cooling flow return passage 132.

As shown in FIGS. 2, 3 and 4, combustor cap assembly 100 further includes a combustor cap plate 140 (hereafter "cap plate 140"), which is coupled to impingement plate 120. Cap plate 140 may be coupled, for example, to outer band portion 128 of impingement plate 120, e.g., via welding. As shown in FIG. 4, cap plate 140 extends circumferentially and radially across impingement plate 120. As shown in FIG. 3, cap plate 140 includes an upstream, impingement side 142, which faces second side 126 of impingement plate 120. An opposite or hot side 144 of cap plate 140 faces towards combustion zone or chamber 50 (FIG. 2) when installed into combustor 24. Combustor cap assembly 100 is operatively coupled to fuel nozzle(s) 48. In one embodiment, as shown in FIGS. 3 and 4, cap plate 140 further defines fuel nozzle passage 122 through which fuel nozzle 48 may extend.

As shown in FIG. 3, and as noted previously, impingement side 142 of cap plate 140 is axially spaced from second side 126 of impingement plate 120 to define impingement air plenum 146 therebetween. Impingement plate 120 and, more particularly, body 121 thereof include a plurality of impingement cooling holes 130 ("cooling holes 130" hereafter) therein. Cooling holes 130 provide for fluid communication from cooling air plenum 110 into impingement air plenum 146.

In certain combustors, cooling holes 130 may not provide sufficient cooling to cap plate 140. Notably, certain combustors may provide fluid communication out of impingement air plenum 146 that may impact the ability of cooling air 18 from cooling holes 130 to efficiently cool cap plate 140. For example, in the illustrative combustor shown, cooling passages 138 provide for fluid communication out of impingement air plenum 146. Also, in the illustrative combustor shown, cooling flow return passage(s) 132 provide for fluid communication out of impingement air plenum 146 to at least one upstream element 154 from impingement plate 120. More particularly, as shown in FIG. 3, combustor cap assembly 100 may include at least one fluid conduit 148, which is in fluid communication with impingement air plenum 146 via cooling flow return passage 132. Fluid conduit 148 defines an exhaust passage, which extends from impingement plenum 146 and/or the cooling flow return passage 132, through cooling air plenum 110 and which is fluidly isolated from cooling air plenum 110.

In various embodiments, as shown in FIG. 3, flow conditioning plate 102 is coupled to forward end portion 114 and/or flange 118 of shroud 104 and receives cooling air 18 from impingement air plenum 146 via fluid conduit 148 (and annular flow passage 54). While upstream portion 154 is illustrated as including a particular flow conditioning plate 102 (as disclosed in U.S. Pat. No. 9,964,308), upstream element(s) 154 may include any now known or later developed combustor components that can use cooling upstream of impingement plate 120. A non-comprehensive list of upstream element(s) 154 may include: flow conditioning plate 102 (illustrated), shroud 104, fuel nozzles 48, casing 40, end cover 42, etc.

Normally, cooling holes 130 are generally aligned to focus jets of compressed air 18 directly onto impingement side 142 of cap plate 140 during operation of combustor 24, thus providing for jets or impingement cooling thereof. However, the various passages (e.g., 132, 138) that provide for fluid communication out of impingement air plenum 146 may prevent some of air 18 from effectively impacting impingement side 142 of cap plate 140.

In order to address this situation, in accordance with embodiments of the disclosure, cooling tubes 160 (hereafter "tube 160") extend from at least a portion of the plurality of impingement cooling holes 130 at second side 126 of impingement plate 120. Cooling holes 130 provide for fluid communication between cooling air plenum 110 and impingement air plenum 146 through tubes 160. As shown in FIG. 4, tubes 160 extend partially towards combustor cap plate 140 through impingement air plenum 146 but do not contact impingement side 142 of cap plate 140. In this manner, tubes 160 ensure more of cooling air 18 impacts impingement side 142 of cap plate 140 prior to being fluidly communicated out of impingement air plenum 146.

Figure 6:
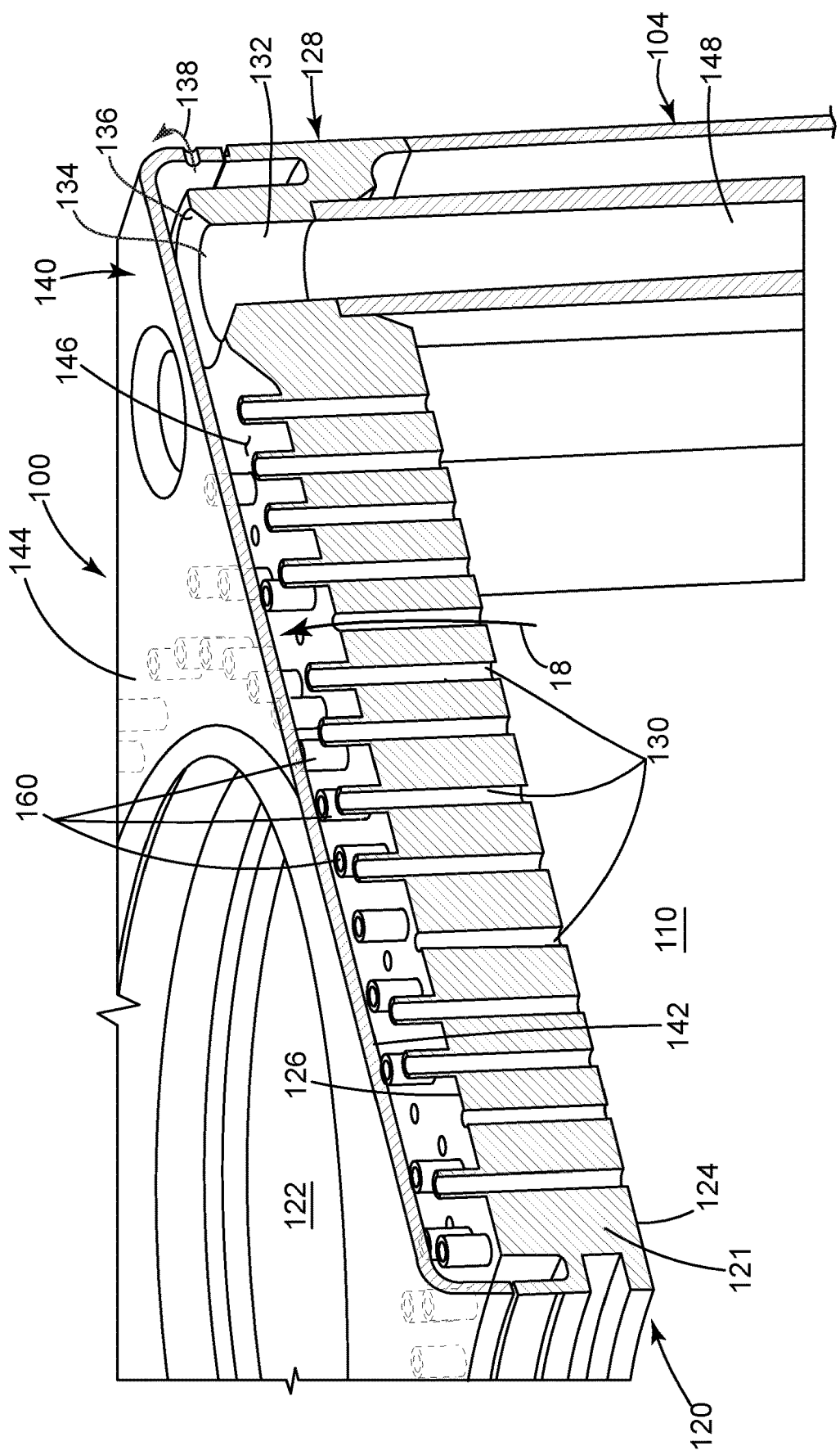
FIG. 6 is an enlarged partial cross-sectional view of a combustor cap assembly with integral cooling tubes, according to one or more embodiments of the disclosure.

In one embodiment, shown in FIG. 6, tubes 160 are integrally coupled with impingement plate 120, i.e., with body 121. That is, tubes 160 are formed as extensions of cooling holes 130. Impingement plate 120 with tubes 160 integral therewith can be made using any now known or later developed manufacturing process such as, but not limited to: additive manufacture, casting, subtractive machining, etc.

Returning to FIG. 4, in another embodiment, each tube 160 is provided as an insert 162 into a respective cooling hole 130. In this manner, tubes 160 provide the same functionality as integral tubes, but the tubes can be applied to new and already existing impingement plates 120. Inserts 162 thus allow application of tubes 160 to older, used impingement plates 120, resulting in improved cap plate 140 cooling in combustion cap assemblies 100 and combustors 24 in which employed. Tubes 160 in the form of inserts 162 can take any form capable of fixed coupling to cooling holes 130.

Figure 7:
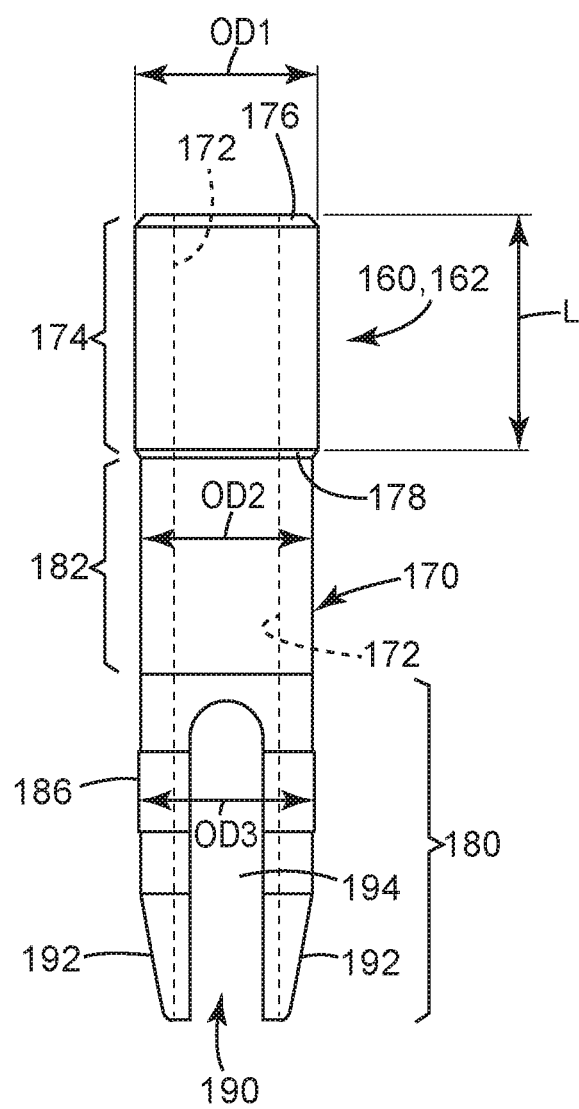
FIG. 7 shows a side view of a cooling tube insert, according to embodiments of the disclosure.
Figure 8:
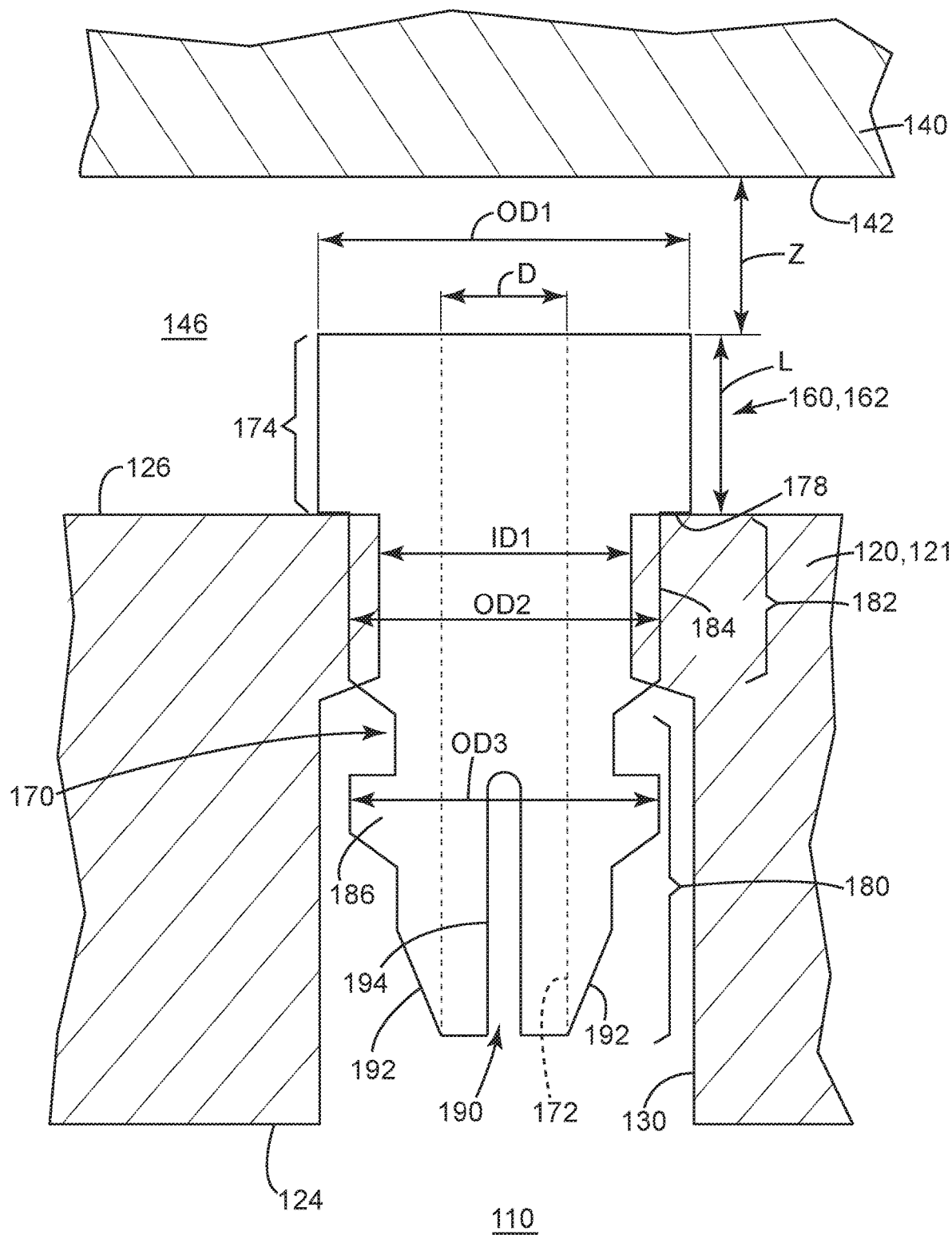
FIG. 8 shows an enlarged cross-sectional view of a cooling tube insert in an impingement plate, according to embodiments of the disclosure.
Figure 9:
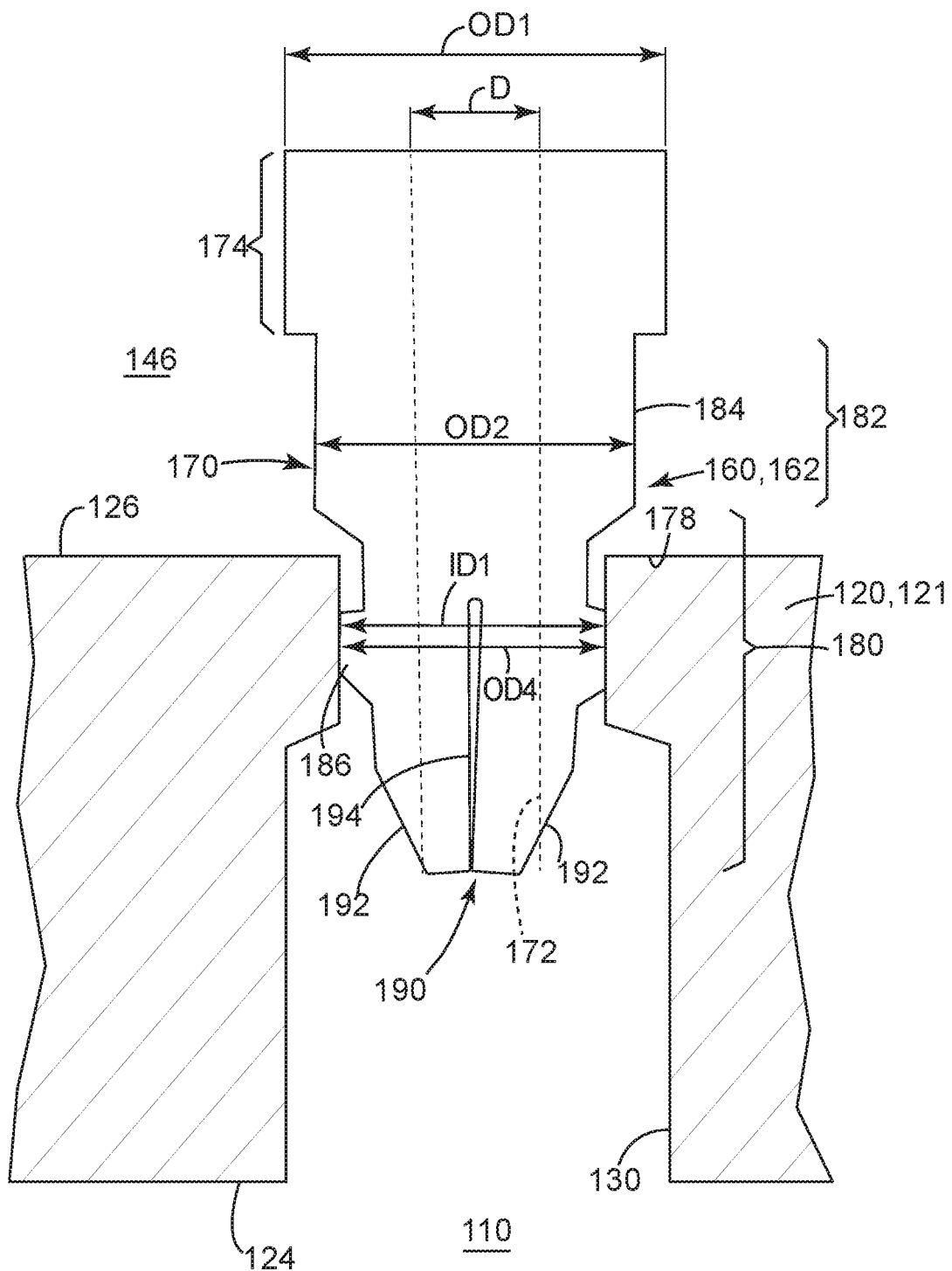
FIG. 9 shows an enlarged cross-sectional view of a cooling tube insert being inserted in an impingement plate, according to embodiments of the disclosure.

FIGS. 7-9 show cross-sectional views of a cooling tube 160 in the form of an insert. FIG. 7 is a side view of an insert 162 alone, FIG. 8 is an enlarged cross-sectional view of insert 162 in position in a respective cooling hole 130 in impingement plate 120, and FIG. 9 is an enlarged cross-sectional view of insert 162 in the process of being inserted/positioned in a respective cooling hole 130 in impingement plate 120. Each cooling hole 130 has an inner dimension (ID1), at least near second side 126 of body 121 of impingement plate 120. Cooling holes 130 may have any cross-sectional shape, e.g., circular, polygonal, etc.

Tubes 160 in the form of inserts 162 may include a body 170 having an opening 172 extending longitudinally therethrough. Opening 172 is in fluid communication with cooling hole 130 and cooling air plenum 110. Opening 172, which has a diameter D, can have any cross-sectional shape, e.g., circular, polygonal, etc. Further, within the limits of a respective cooling hole 130 and body 170 wall thickness, opening 172 can have any cross-sectional area desired. While FIGS. 4 and 6 illustrate tubes 160 with uniform sized openings 172 (that is, openings 172 having a constant cross-sectional size and shape), tube(s) 160 can have openings 172 with different sizes and/or shapes along the length of opening(s) 172. The shape and/or size of openings 172 can be defined to provide any impingement cooling desired, i.e., providing customized cooling, where necessary, to cap plate 140. Opening(s) 172 shape can match those of cooling holes 130 or may be different. In some embodiments, a first or first group of inserts 162 may have opening(s) 172 with a first size and/or shape, while a second or second group of inserts 162 may have opening(s) 172 with a second size and/or shape.

Body 170 may also include a discharge end 174 configured for positioning in impingement air plenum 146 and through which opening 172 passes. In one embodiment, discharge end 174 may include a chamfered surface 176 (FIG. 7) to facilitate air flow thereabout, but this is not necessary in all instances. Discharge end 174 includes an outer dimension (OD1) larger than inner dimension (ID1) of a respective cooling hole 130 (near second surface 126 of body 121), i.e., OD1>ID1. In this manner, discharge end 174 limits the extent to which insert 162 can enter a respective cooling hole 130. Discharge end 174 may include a seat 178 configured to contact second side 126 of impingement plate 120. A length L of discharge end from seat 178 to the terminal end of insert 162 can determine the extent to which tube 160 traverses impingement air plenum 146. The length L can be defined to provide any Z/D factor (FIG. 8) or impingement cooling desired (where Z is distance from tube 160 to impingement side 142 of cap plate 140, and D is diameter of opening 172 in tube 160). While FIGS. 4 and 6 illustrate tubes 160 with uniform length, it is emphasized that lengths of tube(s) 160 may vary within a particular impingement plate 120 to provide customized cooling (e.g., different Z/D factors), where necessary, to cap plate 140.

Body 170 may also include a flexible insertion end 180 configured for insertion into a respective cooling hole 130 and a fixation element 182 between discharge end 174 and flexible insertion end 180. As will be described, fixation element 182 is configured to fixedly couple tube 160 in the respective cooling hole 130. Fixation element 182 has an outer dimension OD2 that is configured to create an interference fit 184 with inner dimension ID1 of respective cooling opening 130 (shown enlarged in FIG. 8). As used herein, "interference fit" can include any now known or later developed fastening between two tight fitting and mating parts that creates a joint held together by friction once the parts are placed/forced together, e.g., press fit, friction fit, bonded fit, bonded press fit, bonded shrink fit (at least one part heated), etc.

Flexible insertion end 180 may include a retention element 186 having an outer dimension OD3 that is larger than outer dimension OD2 of fixation element 182 and inner dimension ID1 of respective cooling hole 130. Flexible insertion end 180 also includes at least one flexing feature 190 configured to allow flexing of retention element 186 as it passes through inner dimension ID1 of cooling opening 130 in an insertion direction (downwardly as shown). Retention element 186 is otherwise configured, e.g., shaped and/or sized, to prevent removal thereof from inner dimension ID1 of cooling opening 130 once insert 162 is inserted in the opening. Flexing feature(s) 190 allows flexing of retention element 186 between, as shown in FIG. 8, a relaxed position having outer dimension OD3, and as shown in FIG. 9, an inwardly flexed position having a flexed, outer dimension OD4 that is temporarily smaller than outer dimensions OD1 and OD2 of body 121 and inner dimension ID1 of respective cooling hole 130.

Flexible insertion end 180 can also optionally include a tapered distal end 192, e.g., to assist insertion into cooling opening 130. Flexing feature(s) 190 can take any form of structure allowing distal end 192 to flex, making an outer dimension OD4 small enough to pass through inner diameter ID1 of cooling opening 130. In one non-limiting example, a flexing feature 190 may include at least one slot 194 extending through a wall of body 170, longitudinally from distal end 192 of flexible insertion end 180. Any number of slots 194 may be employed, e.g., a pair of diametrically opposing slots (shown), two pairs of diametrically opposing slots, an odd number of circumferentially spaced slots, etc. In this manner, insert 162 can be readily inserted into respective cooling hole 130 and prevented from removal from cooling opening 130 by retention feature 186 if ever interference fit 184 fails.

Insert 162 may include any now known or later developed material capable of withstanding the environmental conditions of combustor 24. In one non-limiting example, insert 162 may include the same material as impingement plate 120, such as, but not limited to, a nickel or cobalt based superalloy or a stainless steel. Similarly, where tubes 160 are integral with impingement plate 120, they can be made of the same material as the impingement plate.

The dimensions described herein can take any of a variety of forms depending on the cross-sectional shapes of cooling holes 130, tube insert 162, etc. In certain embodiments, as shown in FIG. 4, cooling holes 130 and tube inserts 162 are circular, making the relevant dimensions diameters of the respective structures. It will be readily recognized that the dimensions can be widths where the structures have other cross-sectional shapes, e.g., ovals/ellipsoid, polygon, etc.

In FIG. 4, every cooling hole 130 is illustrated as including a respective tube 160. However, as illustrated in FIG. 6, not every cooling hole 130 requires a tube 160. In accordance with embodiments of the disclosure, tubes 160 can be used wherever necessary to create the cooling required. Accordingly, in certain embodiments, some cooling holes 130 may not have a tube 160. Similarly, while cooling holes 130 are shown all with the same inner dimension, cooling holes 130 and/or tubes 160 may have different dimensions within a particular impingement plate 120, e.g., the inner dimension of each can vary across impingement plate 120 to provide more or less cooling air 18 in desired locations to customize the cooling. In addition, as noted herein, a length L that discharge end 174 of tube 160 extends from second side 126 of impingement plate 120 (and related Z/D factor) may vary across the impingement plate 120 to provide the desired cooling where necessary.

Referring to FIG. 10, alternative embodiments of an impingement plate 120 and a tube 260, in the form of an insert 262, are illustrated. In this embodiment, each of the at least a portion of plurality of impingement cooling holes 130 includes a tube retention seat 200 at first side 124 of impingement plate 120. Also, in this embodiment, a body 270 of insert 262 is configured for positioning in a respective impingement cooling hole 130 and has opening 172 extending longitudinally therethrough. Tube 260/insert 262 extends through impingement cooling hole 130 with a clearance fit 284. That is, outer dimension OD5 of insert 262 has a clearance fit with inner diameter ID1 of impingement cooling opening 130, OD5<ID1. A discharge end 274 of insert 262 is configured for positioning in impingement air plenum 146 but is devoid of seat 178 (FIG. 8).

Body 270 also includes a fixation collar 202 opposite discharge end 274. Fixation collar 202 extends radially from a fixation end 210 of body 270. Fixation collar 202 is configured to matingly couple body 270 in tube retention seat 200. In this embodiment, a tube retention element 220 is coupled to first side 124 of body 121 of impingement plate 120, e.g., by fasteners or welding. Tube retention element 220 fixedly holds fixation collar 202 in tube retention seat 200, which holds each tube 260 in position with discharge end 274 disposed in impingement air plenum 146. Tube retention element 220 may include any member capable of retaining fixation collar(s) 202 in tube retention seat(s) 200.

In one non-limiting example, tube retention element 220 includes a perforated metal plate with a plurality of openings 222 co-axially aligned with cooling holes 130 of impingement plate 120. Specifically, each opening 222 of tube retention element 220 is in fluid communication with cooling air plenum 110 and opening 172 in body 270 of tube 260, thus allowing coolant to pass from cooling air plenum 110 through tube retention element 220 and through tube 260 to impingement air plenum 146. Each opening 222 is sized appropriately, such that a perimeter surface 224 of opening 222 engages fixation collar 202, thus preventing removal of tube 260 from impingement plate 120. Any number of tube retentions seats 200 and openings 222 may be provided in impingement plate 120 and tube retention element 220, respectively.

Returning to FIGS. 4 and 6, in operation, a method according to embodiments of the disclosure may include communicating cooling air 18 from cooling air plenum 110 through impingement plate 120 that defines cooling holes 130 therein. As noted, first side 124 of impingement plate 120 is in fluid communication with cooling air plenum 110. The method may also include directing cooling air 18 through tubes 160 extending from at least a portion of cooling holes 130 at second side 126 of impingement plate 120 toward combustor cap plate 140. Hence, embodiments of the disclosure provide tubes 160 to impingement plate 120 to allow more precise and closer delivery of cooling air 18 to combustor cap plate 140. The tubes may be integrally formed with impingement plate 120, or they can be provided as inserts 162 so they can be applied to existing impingement plates 120.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately" as applied to a particular value of a range applies to both end values and, unless otherwise dependent on the precision of the instrument measuring the value, may indicate+/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application and to enable others of ordinary skill in the art to understand the disclosure for various embodiments with various modifications as are suited to the particular use contemplated.

What is claimed is:

1. A combustor cap assembly, comprising:
an impingement plate defining a plurality of impingement cooling holes, wherein a first side of the impingement plate is in fluid communication with a cooling air plenum;
a combustor cap plate coupled to the impingement plate, wherein the combustor cap plate and a second side of the impingement plate define an impingement air plenum therebetween; and
tubes extending from at least a portion of the plurality of impingement cooling holes at the second side of the impingement plate and extending partially towards the combustor cap plate through the impingement air plenum;
wherein each tube includes a body having a central opening extending longitudinally therethrough, the body further including:
a discharge end positioned in the impingement air plenum,
a flexible insertion end inserted into a respective impingement cooling hole of the plurality of impingement cooling holes, a fixation element between the discharge end and the flexible insertion end, the fixation element having a first outer dimension that is fully annular and circumferentially solid about a length of the fixation element, wherein the first outer dimension of the fixation element and an inner dimension of the respective impingement cooling hole create an interference fit to fixedly couple each tube in the respective impingement cooling hole of the at least the portion of the plurality of impingement cooling holes, wherein each tube provides for fluid communication between the cooling air plenum and the impingement air plenum through the central opening of each tube and the respective impingement cooling hole; and wherein the flexible insertion end includes:
a retention element having a second outer dimension that is larger than the first outer dimension of the fixation element and the inner dimension of the respective impingement cooling hole,
at least one flexing feature configured to allow flexing of the retention element between a relaxed position having the second outer dimension and an inwardly flexed position having a flexed, outer dimension that is temporarily smaller than the first and second outer dimensions and the inner dimension of the respective impingement cooling hole, and
wherein the at least one flexing feature includes at least one slot extending longitudinally through a wall of each tube from a distal end of the flexible insertion end.

2. The combustor cap assembly of claim 1, wherein the flexible insertion end includes a tapered distal end.

3. The combustor cap assembly of claim 1, wherein the discharge end has a chamfered surface.

4. The combustor cap assembly of claim 1, wherein the discharge end includes a third outer dimension larger than the inner dimension of the respective impingement cooling hole of the plurality of impingement cooling holes and a seat configured to contact the second side of the impingement plate.

5. The combustor cap assembly of claim 1, wherein the impingement plate further includes an outer band, wherein the outer band defines a plurality of cooling passages circumferentially spaced along the outer band, wherein the plurality of cooling passages provides for fluid communication out of the impingement air plenum in an outward direction at an angle relative to a radius.

6. The combustor cap assembly of claim 1, wherein the impingement plate defines a cooling flow return passage in fluid communication with the impingement air plenum, the cooling flow return passage in fluid communication with at least one upstream element from the impingement plate.

7. A combustor, comprising:
a combustor cap assembly operatively coupled with a fuel nozzle, the combustor cap assembly including:
an impingement plate defining a plurality of impingement cooling holes, wherein a first side of the impingement plate is in fluid communication with a cooling air plenum;
a cap plate coupled to the impingement plate, wherein the cap plate and a second side of the impingement plate define an impingement air plenum therebetween; and
tubes extending from at least a portion of the plurality of impingement cooling holes at the second side of the impingement plate and extending partially towards the cap plate through the impingement air plenum; and
the fuel nozzle extending through the combustor cap assembly,
wherein each tube includes a body having a central opening extending longitudinally therethrough, the body further including:
a discharge end positioned in the impingement air plenum,
a flexible insertion end inserted into a respective impingement cooling hole of the plurality of impingement cooling holes,
a fixation element between the discharge end and the flexible insertion end, the fixation element having a first outer dimension that is fully annular and circumferentially solid about a length of the fixation element,
wherein the first outer dimension of the fixation element and an inner dimension of the respective impingement cooling hole create an interference fit to fixedly couple each tube in the respective impingement cooling hole of the at least the portion of the plurality of impingement cooling holes,
wherein each tube provides for fluid communication between the cooling air plenum and the impingement air plenum through the central opening of each tube and the respective impingement cooling hole; and
wherein the flexible insertion end includes:
a retention element having a second outer dimension that is larger than the first outer dimension of the fixation element and the inner dimension of the respective impingement cooling hole; and
at least one flexing feature configured to allow flexing of the retention element between a relaxed position having the second outer dimension and an inwardly flexed position having a flexed, outer dimension that is temporarily smaller than the first and second outer dimensions and the inner dimension of the respective impingement cooling hole, and
wherein the at least one flexing feature includes at least one slot extending through a wall of each tube longitudinally from a distal end of the flexible insertion end.

8. The combustor of claim 7, wherein the discharge end includes a third outer dimension larger than the inner dimension of the respective impingement cooling hole of the plurality of impingement cooling holes and a seat configured to contact the second side of the impingement plate.

9. The combustor of claim 7, wherein the impingement plate further includes an outer band, wherein the outer band defines a plurality of cooling passages circumferentially spaced along the outer band, wherein the plurality of cooling passages provides for fluid communication out of the impingement air plenum in an outward direction at an angle relative to a radius.

10. The combustor of claim 7, wherein the impingement plate defines a cooling flow return passage in fluid communication with the impingement air plenum, the cooling flow return passage in fluid communication with at least one upstream element from the impingement plate.

* * * * *